Patented Feb. 28, 1933

1,899,388

UNITED STATES PATENT OFFICE

ARTHUR R. HITCH AND IRVIN A. EBAUGH, OF BRUNSWICK, GEORGIA, ASSIGNORS, BY MESNE ASSIGNMENTS, TO GILLICAN-CHIPLEY COMPANY, A CORPORATION OF DELAWARE

PROCESS OF RECOVERING ROSIN FROM COLLECTED CRUDE MATTER

No Drawing. Application filed April 2, 1928. Serial No. 266,864.

This invention relates to a process of obtaining a high grade rosin. The process provides particularly for the treatment of batting and strainer dross, and cup skimmings whereby a rosin of high quality is obtained from a comparatively low grade material.

The recovery of rosin from batting and strainer dross and cup skimmings has become of considerable importance. Heretofore, large quantities of rosin were lost due to the rejection of these materials which amount to approximately two and one-half percent of all the rosin produced, and contain approximately eighty percent rosin.

It has been found that by the process of this invention, a yield of as much as eighty-three percent or above of a high grade rosin of the quality "X" or better may be obtained from the above materials. The finished product is very light in color, clear and sparkling, free from all suspended matter, and is low in turpentine and water content. It has a relatively high melting point, dissolves completely and easily in ordinary rosin solvents, and is not easily crystallizable from these solvents. These properties are highly desirable in rosin when used in such commodities as varnishes, lacquers, soaps, sizes, and so forth.

In general, the process of this invention includes distilling off any turpentine, oils, water, and other easily volatilized matter which may be present in the dross or skimmings, then distilling the residue preferably under a very high vacuum, and then heating the distillate in the presence of an inactive gas or vapor. It has been found that dross and skimmings treated in this way, yield a product with all of the above desirable properties which apparently are not obtainable in products derived from the same source in processes heretofore in use. A fairly high grade rosin is produced after the first two steps outlined, namely, after distilling off the volatile substances and then distilling the residue under a high vacuum. However, the quality is improved after the third step consisting of heating the distillate obtained in the second step in the presence of an inactive fluid. The high vacuum brings about a rapid distillation and prevents the formation of an objectionable amount of rosin oils and various other products.

The turpentine, water, and so forth, are removed from the dross or skimmings, by distilling with or without steam, carbon dioxide, or other inactive fluids, at pressures greater or less than atmospheric at the temperatures corresponding with such pressures. The residue is preferably distilled under a very high vacuum, from 0.01 to 50 mm. absolute pressure, at that temperature and rate which will produce the biggest yield and the lightest colored product with proper melting points. The temperature is kept as low as possible, from 200° C. to 350° C. The rate of distillation is as rapid as possible and the distillation is carried on with or without the use of an inactive fluid.

The product so obtained is light in color, clear, free from suspended matter, turpentine and water, and is entirely soluble in solvents. However, in order to lighten the color and to increase further the degree of solubility and also to impart the property of not readily crystallizing out in solvents, the distilled rosin is heated in an atmosphere of carbon dioxide, steam, nitrogen, hydrogen, or other inactive gases or vapors, at atmospheric or higher pressures, or under vacuum at a temperature of from 245° C. to 350° C. for a period of from ten minutes to several days or longer, depending upon the conditions of temperature and pressure, as well as the nature of the material treated. Control tests may be made from time to time, until a desirable product is obtained. The rosin is then cooled as quickly as possible and poured into containers at a relatively low temperature. The explanation for the exact effect produced on rosin by mere heating to accomplish the result noted, has not been satisfactorily determined.

It is preferable to use an inactive fluid, such as those mentioned, wherever possible in the course of the process. The term inactive is defined as having substantially no chemical effect on rosin.

The following is given as an example of the process:

The collected crude materials, such as dross and skimmings, are placed in a still. The temperature in the still is brought up slowly until all of the low boiling constituents such as water and turpentine are driven off. A high vacuum of from 0.01 to 50 mm. absolute pressure is then applied to the still, and the temperature quickly raised to 200° C. to 350° C., preferably 200 to 285° C., at which temperatures rosin distills over and is condensed. The distillation is carried on from the beginning with or without the use of an inactive gas or vapor. The rosin distillate is then heated in an atmosphere of an inactive gas or vapor at a temperature of from 245° C. to 350° C., preferably around 285° C., for ten minutes or more, depending on the temperatures and pressures used and the nature of the distilled product. The higher the temperature the shorter will be the time required. The rosin is finally cooled as quickly as possible and discharged from the heating vessel into proper containers at a relatively low temperature.

By means of the above process, dross and skimmings and other collected crude matter, yield a rosin product which is comparable with the best grade of rosin, which heretofore was apparently not obtainable from such sources. This phase of rosin recovery is hereby placed on a highly paying basis.

The term "collected crude matter", as used in the claims, includes batting and strainer dross, cup skimmings, and such other waste matter which is collected in the general plant operations during the production of rosin, and having the proportion of rosin set forth in connection with the process of this invention.

It will be noted that the treatment of the product obtained by distillation is described as simply that of heating the material in an atmosphere of inactive gases under the conditions defined.

What we claim is:

1. The process of recovering rosin from "collected crude matter" including batting and strainer dross and cup skimmings which process consists in heating such collected crude matter until all of the turpentine, water, and other easily volatilized matter present is distilled off leaving a residue containing rosin, heating the residue to distill off the rosin in the presence of an inactive gas, and then heating, without distillation, the rosin distillate obtained from the residue in the presence of an inactive gas until a clear high grade non-crystallizing rosin is obtained.

2. The process of recovering rosin from "collected crude matter" including batting and strainer dross and cup skimmings, which process consists in heating such collected crude matter until all of the turpentine, water, and other easily volatilized matter present is distilled off leaving a residue containing rosin, heating the residue to distill off the rosin in the presence of an inactive gas, and then heating, without distillation, the rosin distillate obtained from the residue in the presence of an inactive gas at a temperature of from 245° C. to 350° C. until a clear high grade non-crystallizing rosin is obtained.

3. The process of recovering rosin from "collected crude matter" including batting and strainer dross and cup skimmings, which process consists in heating such collected crude matter until all of the turpentine, water, and other easily volatilized matter present is distilled off leaving a residue containing rosin, heating the residue and distilling off the rosin under a high vacuum at a temperature of from 200° C. to 350° C. in the presence of an inactive gas, and then heating without distillation the rosin distillate obtained from the residue in the presence of an inactive gas at a temperature of from 245° C. to 350° C. until a clear high grade non-crystallizing rosin is obtained.

4. The process of recovering rosin from "collected crude matter" including batting and strainer dross and cup skimmings, which process consists in heating such collected crude matter until all of the turpentine, water, and other easily volatilized matter present is distilled off leaving a residue containing rosin, steam distilling the residue to distill off the rosin, and then heating without distillation the rosin distillate from the residue in the presence of steam until a clear high grade non-crystallizing rosin is obtained.

5. The process of recovering rosin from "collected crude matter" including batting and strainer dross and cup skimmings, which process consists in heating such collected crude matter until all of the turpentine, water, and other easily volatilized matter present is distilled off leaving a residue containing rosin, steam distilling the residue at a temperature of from 200° C. to 350° C. to distill off the rosin, and then heating without distillation the rosin distillate from the residue in the presence of steam at a temperature of from 245° C. to 350° C. until a clear high grade non-crystallizing rosin is obtained.

In testimony whereof we affix our signatures.

ARTHUR R. HITCH.
IRVIN A. EBAUGH.